Sept. 2, 1952  W. H. QUINN  2,608,909
MILLING ATTACHMENT FOR LATHES
Filed Jan. 6, 1950  2 SHEETS—SHEET 1
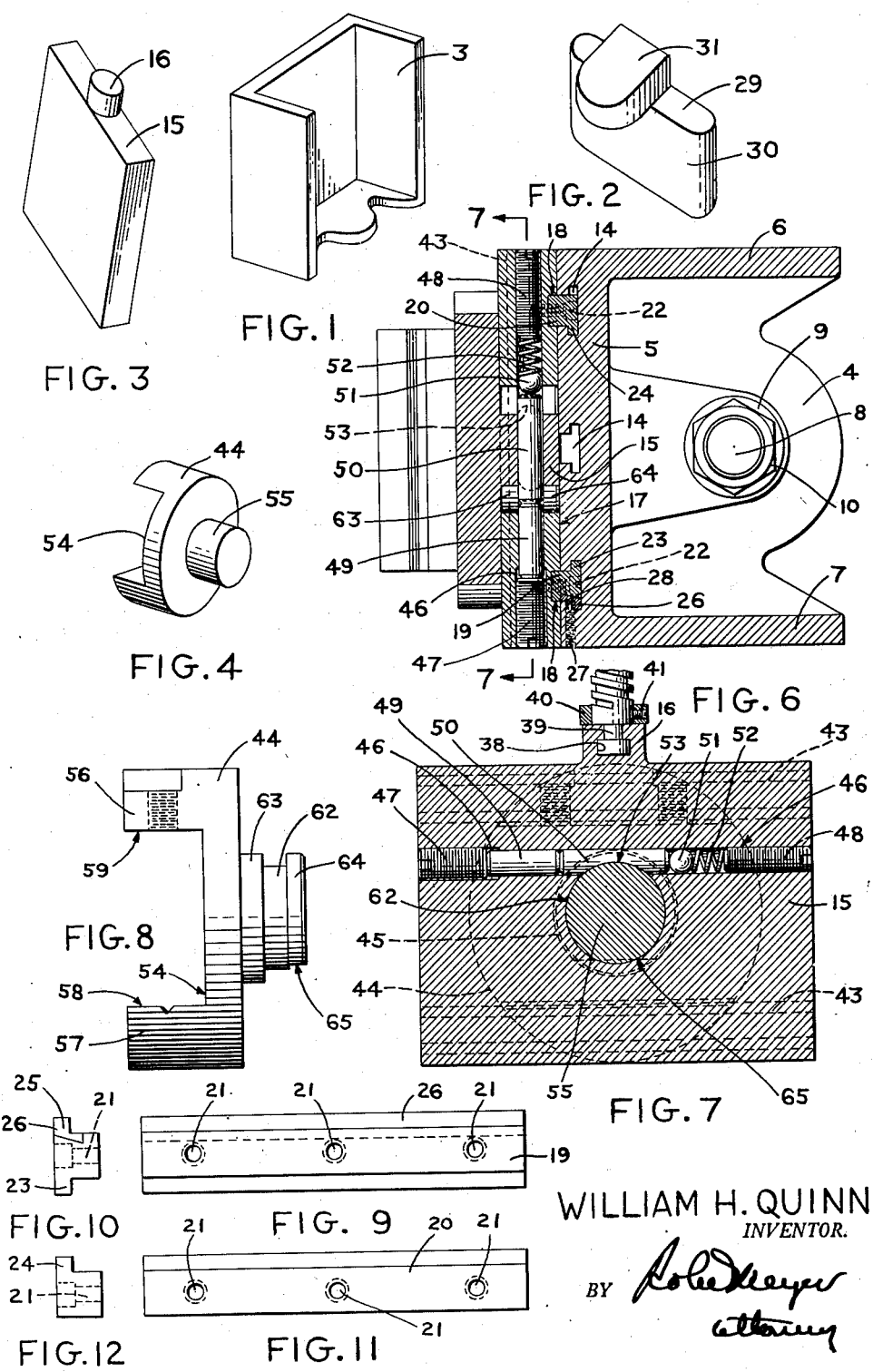
WILLIAM H. QUINN
INVENTOR.
BY
ATTORNEY Sept. 2, 1952        W. H. QUINN        2,608,909
MILLING ATTACHMENT FOR LATHES Filed Jan. 6, 1950        2 SHEETS—SHEET 2

WILLIAM H. QUINN
*INVENTOR.*

BY

Patented Sept. 2, 1952

2,608,909

UNITED STATES PATENT OFFICE 2,608,909

MILLING ATTACHMENT FOR LATHES

William H. Quinn, West Orange, N. J.

Application January 6, 1950, Serial No. 137,071

11 Claims. (Cl. 90—59)

This invention relates generally to attachments for a lathe and more particularly to a milling attachment adapted to be mounted on a lathe for the performance of all types of regular milling operations.

Machines and apparatus such as milling machines and the like are particularly adapted for the performance of milling operations. It has been found, however, that by adapting a movable vise-like member to the bed or the carriage mounted on the bed of an ordinary metal lathe, such vise-like member generally termed a milling attachment, and utilizing the head stock as a driving member for a milling cutter that many of these same operations may be easily and satisfactorily performed by an ordinary metal lathe.

Accordingly, various types of milling attachments have been developed for the market. Many of these milling attachments, however, have structural and operational defects of one type or another and in particular lack the necessary rigidity which is required for the accurate performance of regular milling operations. An additional defect is that many of these devices cannot be rotated through a full 360° circumference in a plane perpendicular to the axial line of the lathe bed and as a result increase the length of time within which many operations can be performed. Furthermore, in those instances where milling attachments have been provided that eliminate these difficulties the cost therefor became relatively high and a loss in rigidity occurs especially in those instances where full 360° rotation is developed.

It has also been found that many of these milling attachments are particularly desirable to the small shop owners. Accordingly, manufacturers have prepared their respective milling attachments, for sale, in pre-assembled form or in "u-build-it" kit form wherein the manufacturer supplies a portion of the milling attachment in semi-machined form with instructions for the completion of the attachment on the shop owner's own lathe. However, these attachments contain the same defects above mentioned.

The present invention provides a novel milling attachment wherein the above mentioned difficulties are overcome and which may be easily made and adapted for use by the small shop owner from a minimum number of castings as will be hereinafter pointed out.

Accordingly, it is an object of the present invention to provide a milling attachment which has a substantially rigid construction.

It is another object of the present invention to provide a milling attachment which can rotate the work upon which milling operations are to be performed through a 360° arc.

It is a further object of the present invention to provide a milling attachment which may be manufactured at low cost and which may be easily adapted to any type of metal lathe.

It is a further object of the present invention to provide a milling attachment which may be easily constructed by a small shop owner on his own lathe from a minimal number of castings so as to enable the shop owner to adapt his lathe for the performance of regular milling operations.

It is a still further object of the present invention to provide a milling attachment which when adapted to a lathe will allow the work chucked therein to be moved vertically, horizontally, longitudinally and rotationally, and which is easily attached to and removed from a lathe as a single preassembled unit.

With these and other objects in view, as may appear from the accompanying specification, the invention consists of various features of construction and combination of parts, which will be first described in connection with the accompanying drawings, showing a milling attachment for lathes of a preferred form embodying the invention, and the features forming the invention will be specifically pointed out in the claims.

In the drawings:

Figure 1 shows the base member in its as cast condition.

Figure 2 shows the support member in its as cast condition.

Figure 3 shows the movable vertical boring table or connecting member in its as cast condition.

Figure 4 shows the vise member in its as cast condition.

Figure 6 is a cross-section taken through the line 6—6 of Figure 5.

Figure 7 is a cross-section taken through the line 7—7 of Figure 6.

Figure 8 is a side view of the rotatable vise member.

Figure 9 is a front view of the master slide showing the gib therewith.

Figure 10 is an end view of the master slide showing the gib therewith.

Figure 11 is a front view of the fixed slide.

Figure 12 is an end view of the fixed slide.

Figure 5:
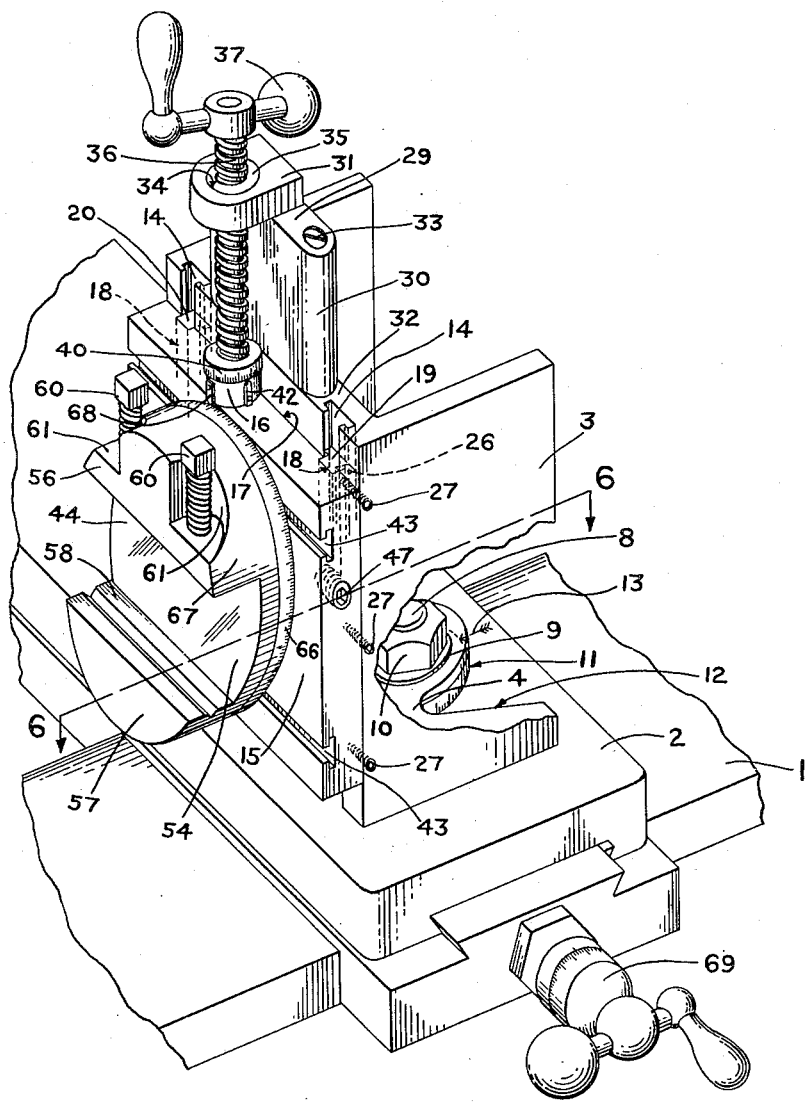
Figure 5 is a prospective view of the invention mounted on a lathe carriage.

The present invention is shown in connection with an ordinary metal lathe, only a fragment of the bed 1 having a carriage 2 being shown however, as the lathe and carriage do not form part of the invention herein. The carriage may be any suitable type of which there are many well known in the art, and moves in the longitudinal axis of the lathe bed. It provides both connecting means and horizontal motion in a plane perpendicular to the longitudinal axis of the lathe bed for the invention, all of which is clearly shown in Figure 5 of the drawings.

The invention as illustrated in fully assembled form is a truly universal milling attachment and as will appear hereinafter by removing various portions thereof may be converted into a movable vertical boring table or stationary vertical boring table to perform additional functions on the lathe.

Referring more particularly to the drawings, Figures 1, 2, 3, and 4 show the as cast appearance of the main members forming the present invention. These members are subjected to machining on the ordinary lathe to provide the slots and openings, etc., by which operable connections are made and to provide surfaces which will give the invention a cosmetic appearance. The remaining portions and members including the crank, springs, pins, etc. may be machined out of regular metal stock available in most machine shops or are easily purchasable on the open market.

Base member

Figures 1, 5, and 6 show the base member 3 having a substantially hemi-sected box-like appearance and formed by a connecting base 4, and a face plate 5 at approximately right angles to each other. Side supports 6 and 7 are provided to lend rigidity to the base member 1. In the present invention the connecting base 4 is indicated as having an opening (not shown) therethrough whereby connecting means with the carriage 2 may be provided such as a bolt 8, washer 9 and nut 10, to lock the base member 1 in any given angular position with respect to the longitudinal axis of the lathe bed, it being understood that while this type of connecting means is shown that other connecting means embodying the same idea may be utilized for this purpose.

Markings 11 may be provided on the outer edge 12 of the connecting base 4 to coact with a fixed line 13 on the carriage 2 whereby the exact angular setting desired may be set.

Base member 1 is also provided with two or more T-slots 14 on the face plate 5 perpendicular to the plane of the longitudinal axis, as is clearly shown in Figures 5 and 6 of the drawings. T-slots 14 are identical in construction and may be utilized in a dual capacity, first to provide a fixed vertical boring table when the remaining members of the invention are not connected to the base member 1, and second as the guide slots for the movable vertical boring table or connecting member 15.

Movable vertical boring table or connecting member

The movable vertical boring table or connecting member 15 is shown in Figure 3 in its as cast condition as a substantially rectangular block having an annular projection 16 on the upper end thereof. On the inner or rear surface 17, slots 18 are cut in axial alignment with the T-slots 14 on the face plate 5 of the base member 1. Slots 18, receive in snug-fit engagement a master slide 19 and a fixed slide 20, which will engage the T-slots 14 so that the boring table or connecting member 15 will be adjustably slidable on the base member but will be able to be locked in position as is hereinafter described.

Master slide 19 and fixed slide 20 are elongated members substantially L-shaped in end view appearance as is indicated in Figures 9, 10, 11, and 12 of the drawings. Openings 21 is provided thereon whereby suitable means such as screws 22 may be passed therethrough into threaded engagement with the member 15 to fixedly connect the slides to the member 15 such that the slides 19 and 20 will fit snugly into the slots 18 as is clearly shown in Figure 6 of the drawings. The slides 19 and 20 are positioned so that the side legs 23 and 24, respectively, will face inwardly or towards each other.

Master slide 19 is further provided with an inset 25 on the side thereof away from the side leg 23 to coact with a brass gib on tongue portion 26 which snugly and slidably engages the inset 25 whereby a T-shaped appearance is formed as is indicated and clearly shown in Figures 9 and 10 of the drawings.

It will be understood that while two slides are shown herein that the invention can be easily modified to a single master slide, substantially larger in width, which would engage a single T-slot on the base member without departing from the spirit of the invention. However, the preferred form has the added advantage of providing a fixed vertical boring table when the base member is utilized by itself as above described.

Thus when the master slide 19 and the fixed slide 20 are fixedly connected to the member 15, member 15 may be in turn set into slidable engagement with the base member 1 through the T-slots 14 of the base member 1, in alignment with the slots 18. However, bronze gib 26 which snugly fits the inset 25 of the master slide 19 may also be positioned in the same T-slot 14 that the master slide 19 engages. The bronze gib 26 when so positioned will not be slidable however, as set screws 27 which threadedly engage the side of the face plate 5 will extend inwardly to contact locking inserts 28 on the bronze gib 26 to keep it from sliding when the movable vertical boring table or connecting member 15 is moved upwardly or downwardly as hereinafter described.

This construction wherein the bronze gib 26 is angularly engaged with the inset 25 of the master slide 19 serves many purposes among which are, increasing the rigidity of the structure, regulating the freedom of sliding movement of the connecting member 15, and acting as a locking means to lock the connecting member in any desired position. These results are effected by adjusting the set screws 27, which causes the bronze gib 26 to move in a sidewise direction. This will increase the force of the surface to surface engagement between the master slide 19 and the bronze gib 26 and due to the angular relationship will increase the amount of surface contact between the rear portions of the master slide 19, the fixed slide 20, and the connecting member 15 with the respective T-slots 14 and the face plate 5 on the base member 1.

The increased surface contact increases the friction thus controlling the freedom of sliding movement and in addition the increased surface contact gives increased rigidity. Locking means is effected by merely tightening the set screws 27 when the connecting member is in a desired position. All of the above is clearly shown in Figures 5 and 6 of the drawings.

Screw support member

To control the movement in the vertical plane of the movable vertical boring table or connecting member 15, a screw support member 29 is provided. Figure 2 shows the support member in its as cast condition comprising a substantially elongated oval cylinder 30 having a flat projection 31 at right angles thereto. The elongated oval cylinder 30 is connected to the upper end 32 of the face plate 5 of the bore member 1 by suitable means such as a screw 33 which passes therethrough into threaded engagement with the upper end of the face plate 5. The support member 30 is positioned so that the flat projection 31 will extend over the connecting member 15 when the connecting member is mounted on the bore member 1 as above described, in axial alignment with the annular projection 16. An opening 34 is formed in the flat projection 31 to receive an internally threaded bushing 35 in which an elongated externally threaded screw member 36 may be rotated by a crank 37 at the upper extension thereof. The screw member 36 extends downwardly in the axial line of the annular projection 16 and is connected thereto by suitable means such as a tongue 38 and a slot 39, which will allow vertical movement of the movable vertical boring table or connecting member 15. A graduated thrust collar 40 is fixedly connected to the screw member 36 by suitable means such as a set screw 41 and will rotate therewith, as is indicated in Figure 7. A fixed pointer or mark 42 may be formed in the annular projection so that the degree of movement may be accurately measured.

Thus, in operation, as the crank 37 is rotated, the elongated screw member 36 will also rotate causing it to move upwardly and downwardly in the bushing 34. However, the tongue 38 and the slot 39 while it allows for rotation of the screw member 36 will still transmit the upward and downward movement to the movable vertical boring table or connecting member 15 so that when the set screws 27 are loose the member 15 may be moved upwardly and downwardly in the T-slots 14. When the member 15 is set in a desired position it may be locked in this position by tightening the set screws 36 as above described.

It can be readily seen that merely considering the connecting member 15 and the base member 1 as presently described that this construction allows for a movable vertical boring table, as transverse T-slots 43 indicated in Figures 5 and 7 may be easily cut in the face thereof to provide suitable connecting means for T-nuts (not shown), studs (not shown) and clamps (not shown) which may be easily made and which are well known in the art.

The movable vertical boring table or connecting member 15 in addition, however, provides the support and connecting means for the rotatable vise member 44 and, in addition, has locking means therethrough for fixing the rotatable vise member 44 in any angular position on an axis parallel to the longitudinal axis of the lathe bed.

An enlarged opening 45 is therefore provided which extends through the connecting member 15. Perpendicular to the axial line of opening 45, such that it will contact the upper circumference of the opening 45, is a bore 46 which passes through the connecting member 15 from side to side. Each end of the bore 46 is internally threaded to receive threaded plugs 47 and 48. A pin 49 abuts plug 47 and is in turn abutted by the locking pin 50. A ball 51 and a spring 52 will engage the locking pin 50 and force it in a sidewise direction when the plug 47 which contacts the spring is turned inwardly and outwardly in the bore 46.

The locking pin 50 is a substantially cylindrical member having an arcuate recess 53 in the side thereof so that in its non-locking position the rotatable vise member 44 may be passed through the opening 45 as hereinafter described.

Rotatable vise member

Figure 4 shows the as cast condition of the rotatable vise member 44, as a substantially annular cylindrical member with a rectangular space 54 on the face thereof and a cylindrical rearward projection 55.

The rectangular space 54 forms an upper jaw 56 and a lower jaw 57 having surfaces 58 and 59, respectively, which are parallel and face each other and which constitute the upper and lower floor of the rectangular space. Gripping screws 60 threadably engage the upper jaw 56 and pass therethrough as indicated in Figures 5 and 7 of the drawings. Milled cutout 61 in the upper jaw being provided so that the gripping screws 60 may be easily moved upwardly and downwardly to engage material placed in the rectangular spaces whereby it will be firmly held between the parallel surface 57 and screws 60 in the vise member 44 for any desired operation thereon when the invention is being operated. It will be understood that while this type of gripping means is shown and described that other gripping means embodying the same idea may be utilized for this purpose.

The cylindrical rearward projection 55 provides means for mounting the vise member 44 on the connecting member 15 and means to coact with the locking pin 50 for locking the vise member 44 in any desired position, as cylindrical projection 55 is provided with an annular groove 62 in the medial portion thereof whereby an inner annulus 63 and an outer annulus 64 will be formed which have a circumference such that the inner and outer annulus 63 and 64 will have a close fit when inserted into the opening 45 of the connecting member 15.

In order to insert the vise member 44 into the connecting member 15 when the locking pin 50 is in position, a cut-away 65 is provided on the outer annulus 64 such that when the milled cutaway is in a plane parallel to the axis of the locking pin 50 the outer annulus 64 will pass underneath the locking pin 50 so that the vise member 44 may be fully inserted into the opening, until the locking pin 50 abuts the inner annulus 63 and is in surface to surface contact with the annular groove 62.

When in this position the vise member 44 may be easily rotated into any angular position. To lock the vise member 44 in a desired angular position the plug 48 is threaded inwardly into the bore 46 exerting tension on the spring 52 and ball 51 which in turn act on the locking pin 50 to move it into locking engagement with the annular groove 62 of the vise member 44, all of which is clearly shown in Figure 7 of the drawings; it being understood that while this type of locking means is shown that other locking means embodying the same idea may be utilized for this purpose.

Graduations 66 are also provided on the outer cylindrical surface 67 of the vise member 44 and a pointer 68 or fixed line perpendicular to the axial line of the lathe bed may also be provided at some suitable location on the connector such as is shown on the projection 16, so that any desired angular setting may be accurately determined by rotating the vise member 44.

Thus, in operation the invention is assembled as above described and locked to the carriage 2 by means of bolt and nut.

The work (not shown) is locked in the vise member by means of the gripping screws 60 which are threaded downwardly into contact with the work forcing it against the surface 58. The vise member 44 is then turned to the desired angular position and locked in this position by threading the plug 48 inwardly into the bore 46 to force the locking pin 50 into locking engagement with the annular groove as above described.

The work may now be moved in the longitudinal line of the lathe bed by manipulating the carriage until it approaches the head stock (not shown) of the lathe which is provided with a suitable cutting tool. Thereafter the work may be manipulated in any horizontal or vertical plane within the limits of the screw members by means of the crank 69 on the carriage and the crank 37 on the invention which are attached thereto whereby a given milling operation may be performed.

If it is desired to change the angular position of the work either in the horizontal plane or the vertical plane the carriage may be moved away from head stock and either the base member 1 reset or the vise member 44 reset or both, whichever is desirable.

As already pointed out by merely removing the vise member 44 and utilizing the transverse T-slots on the face of the connecting member 15, a movable vertical boring table will be formed by utilizing T-nuts, studs and clamps therewith. And by the additional removal of the connecting member 15, a fixed vertical boring table is also provided as the T-slots 14 thereon may be adapted for use with suitable T-nuts, studs and clamps; T-nuts, studs and clamps being well known in the art when used in this fashion.

While one form of the invention has been illustrated and described, it is obvious that those skilled in the art may vary the details of construction as well as the precise arrangement of parts without departing from the spirit of the invention and, therefore, it will be understood that the invention is not to be limited to the specific construction or arrangement of parts shown but that they may be widely modified within the invention defined by the claims.

What is claimed is:

1. An attachment for lathes having a movable carriage thereon comprising, a base member adapted to be mounted on said carriage, vertically disposed T-slots on said base member, a connecting member, a master slide and a fixed slide fixedly connected to said connecting member, said master slide and said fixed slide to provide slidable connecting means between said connecting member and said T-slots, a vice member rotatably mounted on said connecting member, a support member mounted on the base member, a screw member in threaded engagement with said support member in the axial line of the connecting member, said screw member adapted to engage said connecting member to move said connecting member in the vertical plane only, an angular inset formed in the master slide, adjustable means mounted in said inset for contact with said connecting member to provide locking means to lock the connecting member in a desired position, and means for locking the vise member in any desired angular position.

2. An attachment for lathes as claimed in claim 1 wherein the adjustable means contacting the inset comprises, a gib having an angular face in snug engagement with the inset, set screws threadably mounted on said base member to engage and move the gib into increased surface to surface engagement with the inset.

3. An attachment for lathes as claimed in claim 1 wherein the means for locking the vise member in any desired position comprises, a bore formed in the connecting member in a plane perpendicular to the axial line of the vise member, a locking pin movably mounted in said bore and positioned so as to contact the vise member, and adjustable means to contact said pin for sidewise movement into and out of locking contact with the vise member.

4. An attachment for lathes having a movable carriage thereon comprising, a base member adapted to be mounted on said carriage, vertically disposed T-slots on said base member, a connecting member, a master slide and a fixed slide fixedly connected to said connecting member, said master slide and said fixed slide to provide slidable connecting means between said connecting member and said T-slots, a vise member rotatably mounted on said connecting member, a support member mounted on the base member, a screw member in threaded engagement with said support member in the axial line of the connecting member, said screw member and said connecting member so constructed and arranged that when the screw member is rotated the connecting member will move therewith in the vertical plane only, an angular inset formed in the master slide, a gib having an angular face in snug engagement with said inset, set screws threadably mounted in said base member to engage said gib for sidewise movement thereof and to hold it from sliding movement with the master slide, a bore formed in said connecting member perpendicular to the axial line of the lathe bed and contiguous to the vise member, a locking pin movably mounted in said bore and positioned to contact the vise member at said contiguous point, resilient means to engage said locking pin, and a plug threaded into said bore to abut the resilient means whereby the locking pin is moved in a sidewise direction by threading the plug into and out of the bore.

5. An attachment for lathes as claimed in claim 4 wherein the locking pin is provided with an arcuate recess so that the vise member may be passed in position when it is mounted on the connecting member.

6. An attachment for lathes having a movable carriage thereon comprising, a base member adapted to be mounted on said carriage, vertically disposed T-slots on said base member, a connecting member, a master slide and a fixed slide fixedly connected to said connecting member, said master slide and said fixed slide to provide slidable connecting means between said connecting member and said T-slots, a support member mounted on the base member, a screw member in threaded engagement with said support member in the axial line of the connecting member, said screw member and said connecting member so constructed and arranged that when the screw member is rotated the connecting member will move therewith in the vertical plane only, an angular inset on the master slide, a gib having an angular face in snug engagement with said inset, set screws threadably mounted in said base member to engage said gib for sidewise movement thereof and to hold it from sliding movement with the master slide to increase the rigidity and control the slidability of the connecting member and to provide locking means for the connecting member, an enlarged bore in said connecting member, a vise member having connecting means thereon to be rotatably mounted in said enlarged bore, and locking means for engagement with said connecting means to lock the vise member in any desired angular position.

7. An attachment for lathes as claimed in claim 6 wherein the connecting means for rotatably mounting the vise member in the enlarged bore comprises, a cylindrical rearward projection on said vise member, an annular groove on said projection forming an inner annulus and an outer annulus, and a cut-away on said outer annulus to allow the outer annulus to pass under said locking means.

8. An attachment for lathes as claimed in claim 6 wherein the locking means for engagement with the connecting means comprises, a transverse bore tangential to the enlarged bore in the connecting member, a locking pin movably mounted in said tangential bore, an arcuate recess on said locking pin to contact the connecting means on said vise member, and adjustable means to contact said locking pin for sidewise movement thereof into and out of locking contact with the vise member.

9. An attachment for lathes having a movable carriage thereon comprising, a base member adapted to be mounted on said carriage, vertically disposed T-slots on said base member, a connecting member, a master slide and a fixed slide fixedly connected to said connecting member, said master slide and said fixed slide to provide slidable connecting means between said connecting member and said T-slots, a support member mounted on the base member, a screw member in threaded engagement with said support member in the axial line of the connecting member, said screw member and said connecting member so constructed and arranged that when the screw member is rotated the connecting member will move therewith in the vertical plane only, an angular inset on the master slide, a gib having an angular face in snug engagement with said inset, set screws threadably mounted in said base member to engage said gib for sidewise movement thereof and to hold it from sliding movement with the master slide to increase the rigidity and control the slidability of the connecting member and to provide locking means for the connecting member, an enlarged bore in said connecting member, a vise member having connecting means thereon to be rotatably mounted in said enlarged bore, said contacting means comprising a rearward projection formed on said vise member, and an annular groove in said rearward projection forming an inner annulus and an outer annulus, a transverse bore tangential to the enlarged bore in the connecting member, a locking pin movably mounted in said tangential bore, an arcuate recess on said locking pin to contact said annular groove on the connecting means, a cut-out on said outer annulus whereby said connecting means may be passed under said locking means, and adjustable means to contact said locking pin for sidewise movement thereof into and out of locking contact with the vise member.

10. An attachment for lathes as claimed in claim 9 wherein the adjustable means to contact the locking pin for sidewise movement comprises, a resilient means abutting the locking pin, and a plug threadably engaging the bore and acting against said resilient means to be threaded into and out of the bore for movement of said locking pin.

11. An attachment for lathes having a carriage thereon comprising, a base member adapted to be mounted on said carriage, at least one vertically disposed T-slot on said base member, a connecting member, at least one slide fixedly connected to said connecting member, said slide to provide a slidable connecting means between said connecting member and said T-slot, a vise member rotatably mounted on said connecting member, means for moving said connecting member in the vertical plane including, a screw support member mounted on said base member, an internally threaded bushing mounted in said screw support member in the axial line of the connecting member, an externally threaded screw member rotatably engaging said bushing, a tongue on one end of said screw member, a crank on the other end of said screw member, a slot for engagement with said tongue on the connecting member, said tongue and said slot arrangement being constructed and arranged to transmit motion to the connecting member in the vertical plane only when the screw member is rotated, adjustable means angularly disposed to said slide to provide locking means to lock the connecting member in any desired position, and means for locking the vise member in any desired position.

WILLIAM H. QUINN.

REFERENCES CITED

The following references are of record in the file of this patent:

UNITED STATES PATENTS

| Number | Name | Date |
|---|---|---|
| 1,318,688 | Paschall | Oct. 14, 1919 |
| 2,203,162 | Lee | June 4, 1940 |
| 2,324,561 | Cripe | July 20, 1943 |
| 2,341,619 | Huss | Feb. 15, 1944 |

FOREIGN PATENTS

| Number | Country | Date |
|---|---|---|
| 703,859 | Germany | Mar. 18, 1941 |